April 29, 1941.　　　W. J. EVANS　　　2,240,395
TABLE AND THE LIKE
Filed April 14, 1939　　5 Sheets-Sheet 3
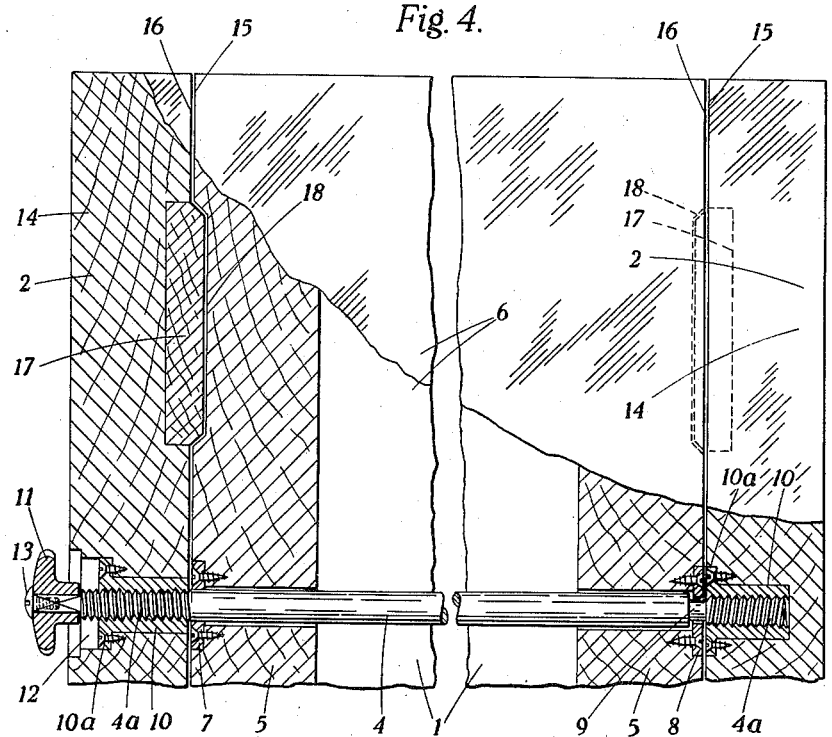
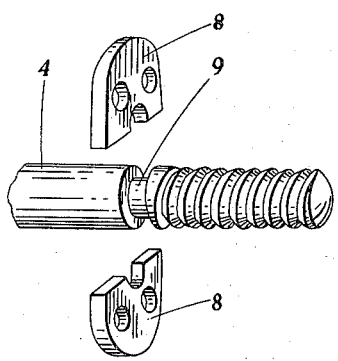
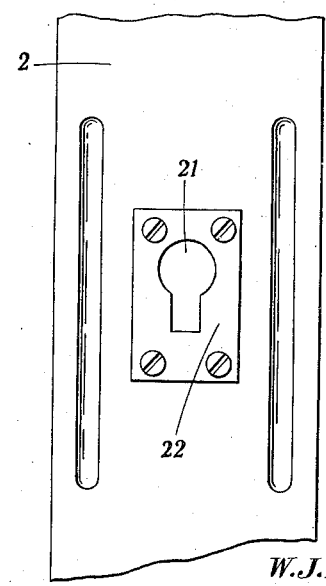
Inventor
W. J. Evans,
by
Attorney Inventor
W. J. Evans,
by *[signature]*
Attorney April 29, 1941.                    W. J. EVANS                    2,240,395
                              TABLE AND THE LIKE
                         Filed April 14, 1939        5 Sheets-Sheet 5
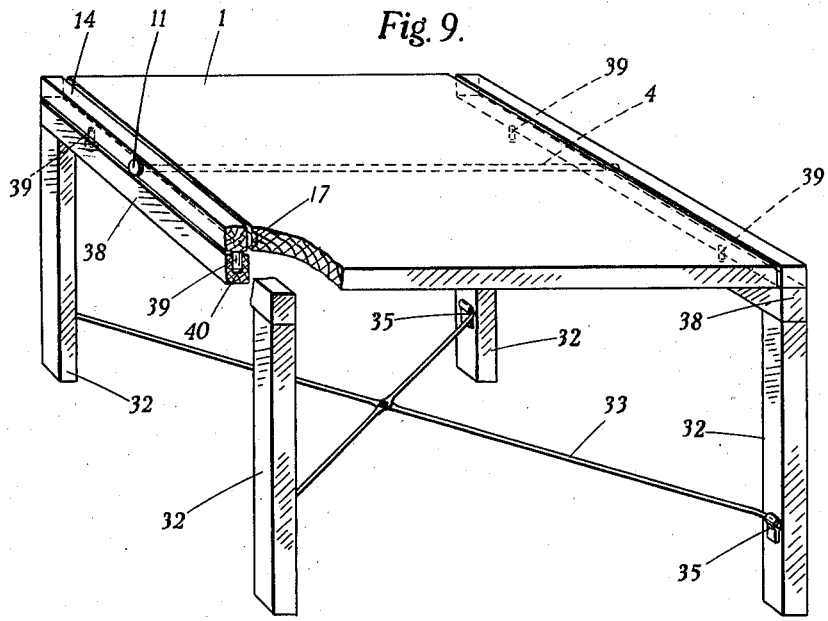
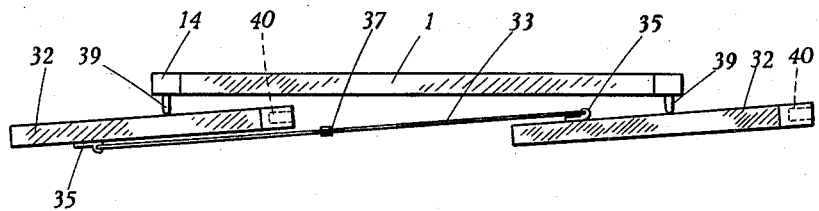
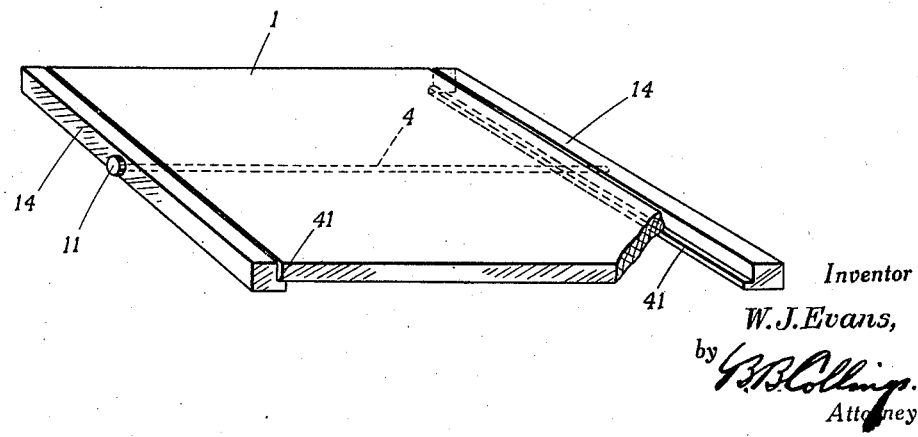
Inventor
W. J. Evans,
by *B. B. Collings.*
Attorney Patented Apr. 29, 1941

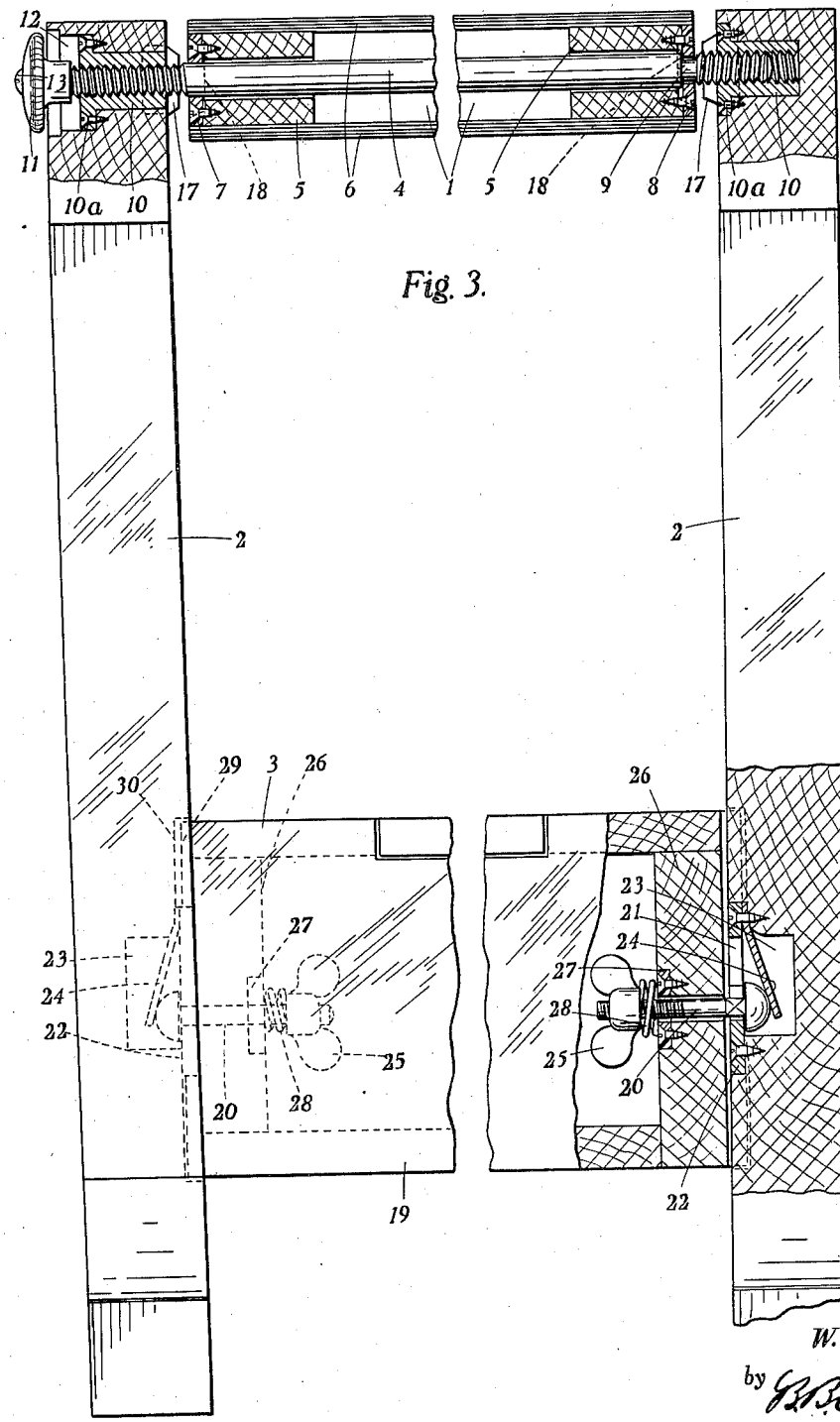

2,240,395

UNITED STATES PATENT OFFICE 2,240,395

TABLE AND THE LIKE

William James Evans, Bulwell, Nottingham, England

Application April 14, 1939, Serial No. 267,866
In Great Britain January 28, 1939

3 Claims. (Cl. 311—35)

This invention comprises improvements in or relating to tables and the like, and refers to tables of the kind having a top that can be swivelled or pivotally displaced in relation to its support or supports, and has means for releasably fixing same in position for use. For example, the table may be provided with a top which is reversible, thereby enabling either side of the top to be brought uppermost at will.

An important object of the invention is to provide particularly simple and effective means for rigidly fixing the swivelling or pivotally displaceable table top in its required position, and for releasing said top to permit of same being displaced from said position, said means permitting of the fixing and release being effected more easily and expeditiously than is possible with previously employed or proposed constructions.

According to the present invention a table or the like of the kind referred to is provided, wherein the pivotally displaceable or swivelling top is releasably fixed in an operative or "in use" position by the operation or manipulation of a device at the axis of movement of said top.

Viewing the invention from one aspect, same provides a table or the like having a top mounted to swivel about an axis so as to bring either of its two opposite sides uppermost, and including means operable at said axis for fixing of said top in either of its two positions and for releasing same for reversal.

The swivelling or pivotally displaceable top of the table in this invention is rigidly retained against movement when in use by the co-operation of parts or elements provided at opposite side edges of the top and at adjacent parts of side members between which said top is mounted. For example, there may be provided keys, ribs, pegs or the like adapted to co-operate with slots, grooves or holes, or there may be provided rabbeted joints or equivalent overlapping joints between the top and its supports. In all cases, however, the top is quickly released for swivelling and fixed against movement by the operation of a device at the axis of movement of the top.

Viewing the invention from yet another aspect, same provides a table having a top mounted to be swivelled or pivotally displaced between side supports, said supports and the adjacent side edges of the top having co-operating parts or elements adapted to be brought into and out of engagement, and means being provided whereby the side supports are moved a short distance away from each other to release said co-operating parts or elements and permit displacement of the top, and whereby said side supports are moved towards one another for bringing said co-operating parts or elements into engagement and fixing the top against displacement.

According to a particular arrangement, the pivotally displaceable or reversible table top is mounted to swivel upon a cross spindle projecting from two opposite sides of the top and having its two projecting ends oppositely screw-threaded, said spindle ends co-operating with internally threaded sockets or sleeves in side supports or standards or parts thereon, and means being provided for rotating the spindle whereby rotation in one direction releases the top for swivelling, and rotation in an opposite direction fixes said top against movement.

For the purpose of more fully describing the nature of this invention, reference will now be made to the accompanying drawings, wherein—

Figure 3 is an enlarged vertical section through the table, the section being taken in a vertical plane through the axis of movement of the top.

Figure 4 is an enlarged part sectional view showing the fixing means for the top.

Figure 5 is a detailed view in perspective of means for carrying one end of the cross spindle on which the top swivels.

Figure 6 shows a slotted attachment plate for use in detachably fixing a crossbar or member between the table legs or supports.

Figure 9 illustrates in perspective a further modified construction of table according to this invention.

Figure 10 is a side view showing the table in Figure 9 folded or collapsed.

Figure 11 illustrates a further method whereby the swivelling top may be rigidly mounted in a fixed position.

Figure 1:
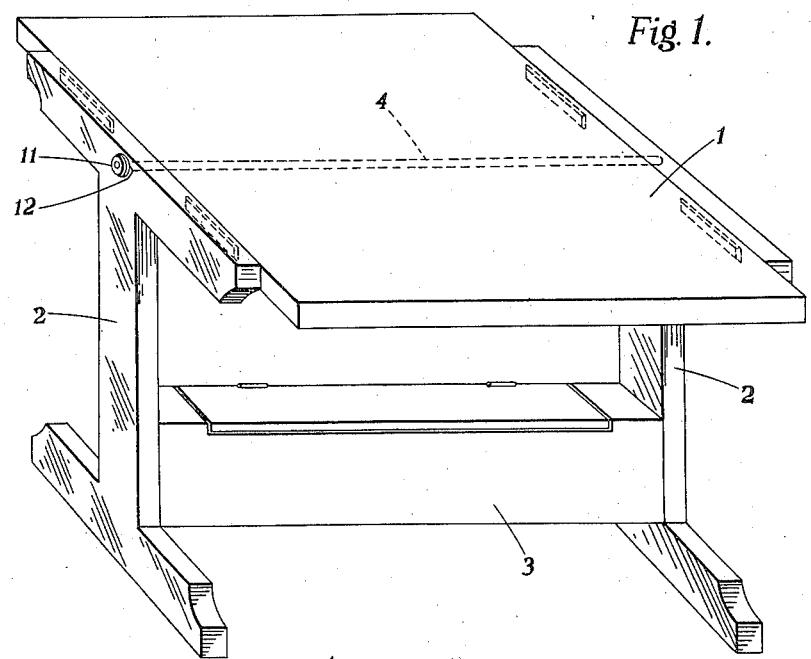
Figure 1 illustrates in perspective a table having a reversible top, and shows the top fixed in the "in use" position.
Figure 2:
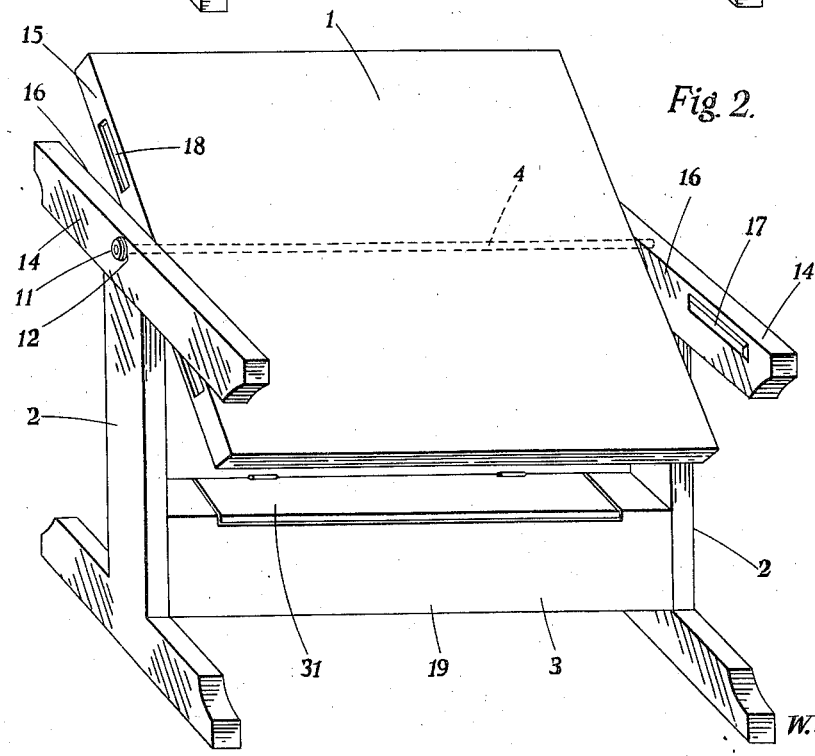
Figure 2 illustrates the same table, with the top released and swivelled from its fixed position.

One method of carrying out the invention will now be described with reference to Figures 1 to 6 of the accompanying drawings, in respect of a table having a top which is adapted to be reversed so that either side face of said top can be brought uppermost.

The top 1 is mounted between two side supports or standards 2 which are connected together by any suitable means, such as by a horizontal cross member 3. The top 1 is mounted upon a cross spindle 4 which is located midway in the width of the top and extends through the thickness thereof, and for this purpose the top is advantageously of hollow construction; that is to say, same is composed of a frame 5, see Fig. 3, to opposite sides of which are secured plywood or equivalent panels 6 constituting the top and bottom faces of the table top. The frame 5 of the top 1 is suitably bored so as rotatably to receive a spindle 4, said spindle projecting a short distance from opposite side edges of the top, there being provided metal attachment plates 7 and 8 at said side edges constituting bearings for the spindle. The one bearing plate 8, see Figs. 3–5, is advantageously formed in two halves which are assembled around a reduced neck portion 9 of the spindle 4, thereby restraining the spindle from axial movement. The two end portions or extensions 4a of the spindle 4 are oppositely screw-threaded, and each of said threaded portions of the spindle co-operates with an internally screw-threaded socket or sleeve 10, the two sockets being let into the upper ends of the legs or supports 2 and fixed in axial alignment with the spindle. One of the internally threaded sockets 10 is secured to and extends into the thickness of the leg from the inner face thereof, while the other internally threaded socket may if desired be fitted from the outer face of the leg, the two sockets being advantageously provided with flanges 10a for screwing same in position.

At one end of the cross spindle 4 is fixed a knob or equivalent spindle-turning element 11, which may if desired be partly accommodated within a recess 12 formed in the outer side face of the leg 2. In the arrangement illustrated in Fig. 4, the knob is assembled on a squared end of the spindle 4 and fixed thereon by a small screw 13. It is to be understood, however, that any suitable means may be provided for enabling the spindle 4 to be easily turned by hand.

The legs 2 are provided at their upper ends with horizontally extending portions 14, which may be so arranged that when the table top 1 is in the horizontal position, the top faces of said extensions 14 lie in or substantially in the same plane as the upper face of the table top. The two opposite side edges 15 of the table top and the two inner vertical faces 16 of the upper portions 14 of the table legs, are provided with releasable interlocking elements adapted to be brought into engagement for rigidly supporting the table top in a horizontal position, and out of engagement for permitting said top to be swivelled or reversed. In a convenient arrangement, elongated keys or ribs 17 are provided or formed on the inner faces 16 of the leg portions 14 adapted to co-act with correspondingly shaped recesses or slots 18 in the side edges 15 of the table top, said keys or the like 17 having bevelled or tapered edges so as to be of substantially wedge shape, and slots or recesses 18 being correspondingly shaped. Preferably four of said keys and slots are provided, two at each side of the table, and same are located equidistant from the central cross spindle 4.

When the table top is fixed in the horizontal or "in use" position, the keys 17 are entered into the slots 18, the oppositely screw-threaded spindle 4 being rotated so as to pull the upper leg portions 14 tightly together in close contact with the side edges 15 of the table top. When it is desired to release the top 1 for pivotal displacement or reversal thereof, the spindle 4 is rotated in an opposite direction so as to force the upper leg portions 14 apart to a sufficient extent to move the keys 17 clear of the co-operating slots 18, and when the keys and slots have been so disengaged the table top is free to be swivelled on the spindle 4. When the top has been reversed or again brought to the horizontal position, the spindle 4 is turned in a direction to bring together the upper leg portions 14 and again enter the keys 17 into the slots 18, the upper leg portions and the side edges of the table being brought into close engagement.

It will be appreciated that the relative positions of the keys 17 and slots 18 may be reversed; that is to say, the keys may be on the table top and the slots in the inner faces of the legs. Also, in lieu of the keys and slots there may be provided pins or dowels and corresponding holes or sockets for receiving same, the pins being preferably rounded or partially tapered. Alternatively, ribs extending along the whole or along part of the length of the upper leg portions 14 may co-operate with grooves or channels extending along the side edges of the table top, or vice versa.

The side legs or supports 2, which may be of any convenient design, may be connected together and retained upright by a horizontal rail, bar or the like 19, said rail being releasably connected at its ends to the inner faces of the two side legs. One method of accomplishing this is by providing a headed bolt 20 projecting from each end of the rail 19, the headed end of said bolt co-operating with a keyhole slot 21 in an attachment plate 22 let into and fixed to the inner face of each leg 2, there being a recess 23 formed in the leg for accommodating the head of the bolt 20. Advantageously also there may be a leaf spring or equivalent element 24 bearing on the head of the bolt 20 and functioning to hold said head up against the inner face of the attachment plate 22. The inner end of the bolt 20 receives a wing nut or the like 25, between which and the inner face of the end wall 26 of the rail 19, or a small face plate 27 attached to said wall, is assembled a small compression spring 28 or spring washer. The springs 28, or spring washers, provided on the bolts 20 at the back of the nuts 25, permit of the necessary small degree of movement of the legs 2 away from each other when the aforesaid spindle 4 is rotated to disconnect the keys and slots 17, 18 for reversing or swivelling the table top. Advantageously the two ends of the horizontal rail or member 19 are formed with a pair of parallelly spaced vertical ribs or tenons 29 which co-operate with corresponding slots or grooves 30 in the legs 2, thereby maintaining the horizontal rail 19 from turning or rocking movement between the legs.

The rail 19 may with advantage be constructed wholly or in part as a hollow box or container with hinged or other displaceable lid 31.

Figure 7:
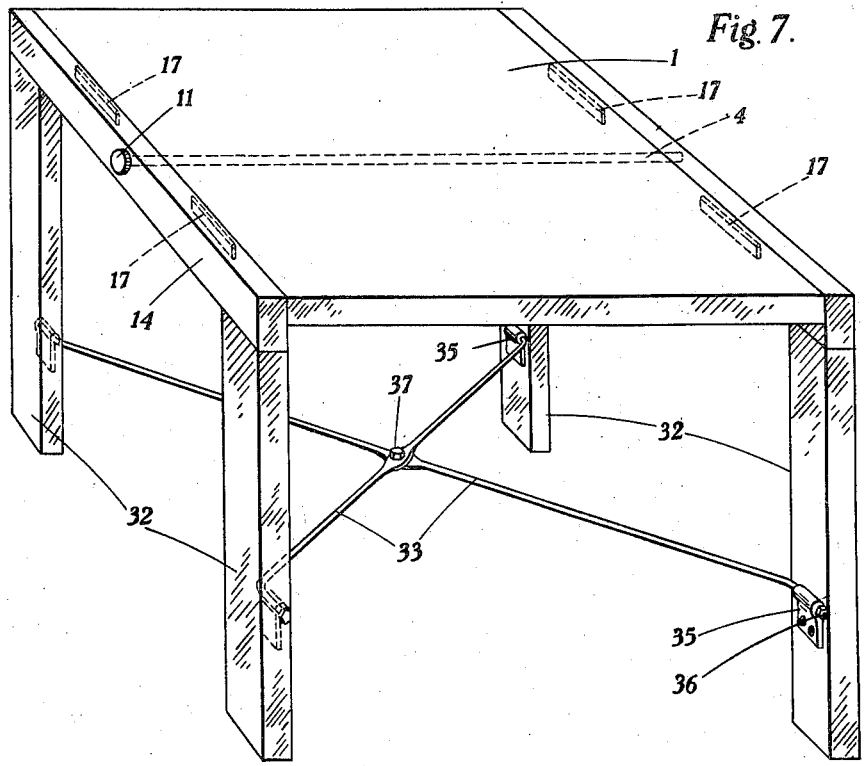
Figure 7 is a perspective view of a modified construction of table.
Figure 8:
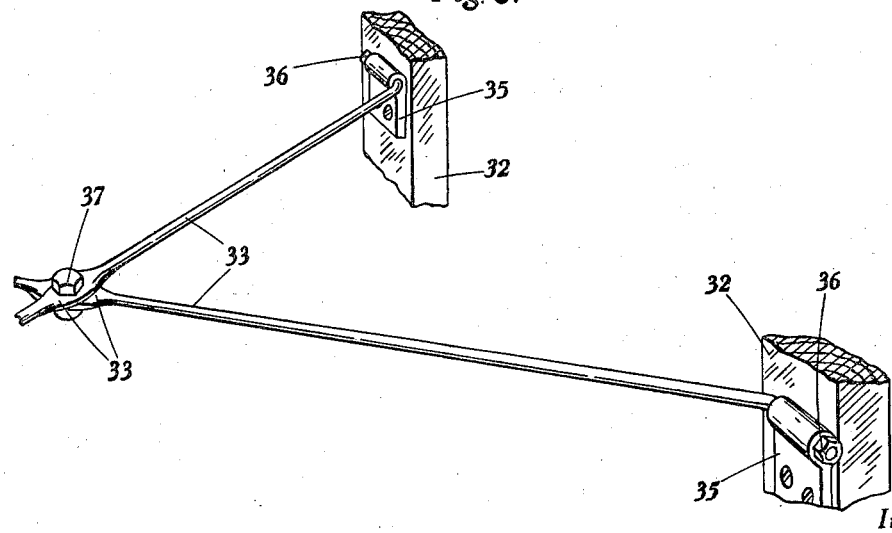
Figure 8 is an enlarged detail view of part of the construction shown in Figure 7.

In some cases it may be desirable to provide a table with four legs, one at or near each corner. One such arrangement is illustrated by way of example in Figures 7 and 8 of the accompanying drawings. Two legs 32 are provided at each side of the table suitably connected at the upper ends to and projecting down from horizontal side bars or members 14 (which correspond to the portions 14 of the previously described construction); the top 1 being mounted to swivel or pivot between said bars 14 about the cross spindle 4 and to be locked or fixed in the "in use" position by co-operating keys 17 and slots 18 or their equivalent as before described. The legs 32 are tied or braced together in a manner which permits of said legs, together with the side bars 14, being laterally displaced to a limited degree. One method of connecting together the four legs 32 is by two diagonally extending rods or bars 33 which cross or intersect one another midway in their length centrally or substantiatlly centrally of the table, said rods being suitably anchored at their ends to the inner faces of the legs and the anchorage being such as will enable the legs to have a sufficient degree of lateral movement at their upper ends or parts to permit of the bars 14 moving a short distance away from and towards each other by rotation of the screwed spindle 4 so as to release the top for swivelling or fix same against swivelling as required.

In the arrangement illustrated, each leg 32 has screwed or otherwise fixed to its inner face a bracket 34 having a socket, sleeve or eye portion 35 with its axis horizontal. Each of the two tie rods 33 is cranked at each end and said cranked ends are assembled within the sockets or sleeves 35 so as to be rotatable therein, there being provided nuts or equivalent terminals 36 screwed or otherwise fixed or formed at the extremities of the cranked ends of the rods 33 so as to hold said rods in the sockets. The two diagonally extending rods 33 may with advantage be suitably connected together at their point of intersection. For example, a small bolt or the like 37 may be inserted through perforations in the two rods. Conveniently the rods may be of circular section and may be flattened at the parts 33a where the bolt or the like 37 is inserted.

It will be appreciated that the pivotal or hinged connection of the tie rods 33 to the legs 32 permits of said legs with the top side bars 14 being displaced laterally by the turning movement of the cross spindle 4 to a sufficient degree for enabling the top one to be released for swivelling and fixed against swivelling in the manner previously described. It will also be appreciated that by providing a table with four corner legs and by providing diagonally disposed intersecting tie rods or the like 33, persons are enabled to sit at each of the four sides of the table without any obstruction to their knees or legs by said table legs or tie rods.

If desired, a table constructed in accordance with this invention may have its legs or supports fixed in such a manner as to permit of same being folded.

One construction of collapsible or foldable table is shown in Figures 9 and 10. Here the side members 14 (between which the top 1 is mounted to swivel on the cross spindle 4 and to which side members said top is adapted to be releasably connected by means such as keys 17 and slots 18 as aforesaid) are themselves mounted for ready detachment from and attachment to bars or the like 38 fixed at the top of and extending between legs 32, so that the top 1 with side members 14 and cross spindle 4 can at any time be removed from the leg or other supports. When the top with the aforesaid associated parts has been detached, the table supports constituted by the legs 32 and cross bars 38 may be folded relatively to the diagonal tie rods 33 by virtue of the fact that said tie rods are hingedly connected at their ends to the legs 32. Thus the table supports and the tie rods can be brought into substantially one general plane. For example, as shown in Figure 10, one of the side supports of the table may be folded in one direction over or upon the tie rods while the opposite side support is folded in an opposite direction on to the other side of the tie rods. If the dimensions of the table permit, however, the two side supports of the table may be folded in the same direction, that is to say both on to the same side of the tie rods. It will thus be appreciated that the detached table top, together with the folded supports, can be brought into comparatively small compass, thereby facilitating storage, packing, transport, etc.

The means for detachably fixing the side bars 14 of the table top to the cross bars 38 of the side supports may be varied in many ways within the scope of the present invention. In the example illustrated in Figures 9 and 10 downwardly projecting pins or pegs 39 are provided on the under side of each of the two side bars 14 adapted to enter and have a close fit within corresponding vertical holes or sockets 40 in the top face of the cross members 38 of the table supports. The co-operating pins 39 and sockets 40 may be of parallel cylindrical shape or may be tapered, while if desired the pins 39 and/or the sockets 40 may be split so as to provide a spring gripping engagement. Alternatively, either the pins or the sockets or both may be formed with bulged or expanded portions, split or otherwise, for increasing the efficiency of the connection.

In lieu of the pins 39 and sockets 40 there may be provided one or more mortise and tenon joints constituted by one or more projecting ribs or keys on the members 14 or members 38 engaging corresponding grooves in the members 38 or members 14. In a further alternative arrangement the members 14 and 38 may be releasably connected by providing one or more plates or their equivalent on one of said members and screwing same to the other member.

It is of course not essential that the tie rods 33 be diagonally disposed, as other tie rods not so disposed may extend between the legs and be hingedly connected thereto for permitting folding of the legs. The diagonal disposition of the tie rods is, however, advantageous as same are out of the way of the legs of persons sitting at the table.

In Figure 11 is illustrated a simplified method of releasably supporting the table top 1 between the side members 14. This is accomplished by providing a rabbeted joint between the top and said side members, each of the side members 14 being provided at its inner face with a ledge 41, the side edges of the table top being adapted to bear upon the ledges 41 when the top is in the "in use" position and being moved out of engagement with said ledges by manipulation of the aforesaid cross spindle 4 when the top is to be swivelled or reversed. The ledges 41 may be formed by recessing the inner faces of the two side members 14 along the whole or part of the length thereof. This method of fixing the top 1 to the members 14 dispenses with the use of co-operating keys and slots or pegs and holes. It will be understood that the top mounted between side members 14, as illustrated in Figure 11, may be rigidly fixed to table supports or may be detachably fixed thereto for enabling the table to be folded or collapsed as before described.

Where the table top is completely reversible and is adapted to be fixed in either of two positions for use, one face of the top may be polished, while the other face may be unpolished so as to be used for domestic purposes such as for ironing, baking or the like. In such case the unpolished surface may be raised somewhat above the top faces of the legs 2 when said unpolished face is uppermost. It will be appreciated, however, that the reversible or swivelling top may be employed as a drawing board or may be provided at either or both sides wtih clips or elements for the attachment of a drawing board.

I claim:

1. A table or the like comprising a top, supports for the top, a pivotal mounting for the top whereby same can swivel in relation to the supports, co-operating parts or elements at adjacent parts of the top and the supports, said co-operating elements functioning when in engagement to retain the top rigid against pivotal movement, and means at the axis of movement of the top for moving said co-operating elements into and out of engagement so as either to fix the top from movement or release same for pivotal displacement.

2. A table or the like comprising a top, side supports for the top, an axle about which the top is adapted to swivel, said axle being carried by and extending between the two side supports, co-operating elements at opposite side edges of the top and the adjacent parts of the side supports, means for rotating the axle relatively to the supports and means whereby rotation of the axle in one direction releases the said co-operating elements to permit pivotal or swivelling movement of the top, and rotation of the axle in an opposite direction brings the co-operating elements into engagement to fix the top from movement.

3. A table or the like comprising a pivotally displaceable or reversible top, legs or uprights for carrying said top, side members associated with said legs and between which the top is mounted to swivel, a cross spindle on which said top swivels, said cross spindle projecting from two opposite sides of the top and having its projecting ends oppositely screw-threaded, internally and oppositely screw-threaded sockets on the side members between which the top is mounted, said oppositely screw-threaded spindle ends co-operating with said internally threaded sockets, co-operating elements provided at opposite side edges of the top and adjacent parts of the said side members, means whereby rotation of the said cross spindle in one direction draws towards one another the side members and brings into engagement the said co-operating elements to fix the top against movement, while rotation of said spindle in an opposite direction forces the side members apart to move the co-operating elements out of engagement and release the top for swivelling.

WILLIAM JAMES EVANS.